United States Patent

[11] 3,628,398

| [72] | Inventor | Walter V. Chery |
| | | 744 Alden St., Meadville, Pa. 16335 |
| [21] | Appl. No. | 662,397 |
| [22] | Filed | Aug. 22, 1967 |
| [45] | Patented | Dec. 21, 1971 |

[54] POWER TRANSMISSION
6 Claims, 10 Drawing Figs.

[52] U.S. Cl. ..................................................... 74/688, 74/769
[51] Int. Cl. ........................................................ F16h 57/10
[50] Field of Search ............................................ 74/688

[56] References Cited
UNITED STATES PATENTS

| 1,526,493 | 2/1925 | Dolton | 74/796 |
| 2,359,540 | 10/1944 | Bade | 74/796 |
| 3,099,171 | 7/1963 | Ivanchick | 74/688 |
| 3,152,490 | 10/1964 | Lemieux | 74/688 |
| 3,203,278 | 8/1965 | General | 74/740 X |
| 3,299,743 | 1/1967 | Stockton | 74/688 X |

Primary Examiner—Arthur T. McKeon
Attorney—Charles L. Lovercheck

ABSTRACT: This invention relates to transmissions and, more particularly, to the traction-type (rolling elements) infinitely variable transmission.

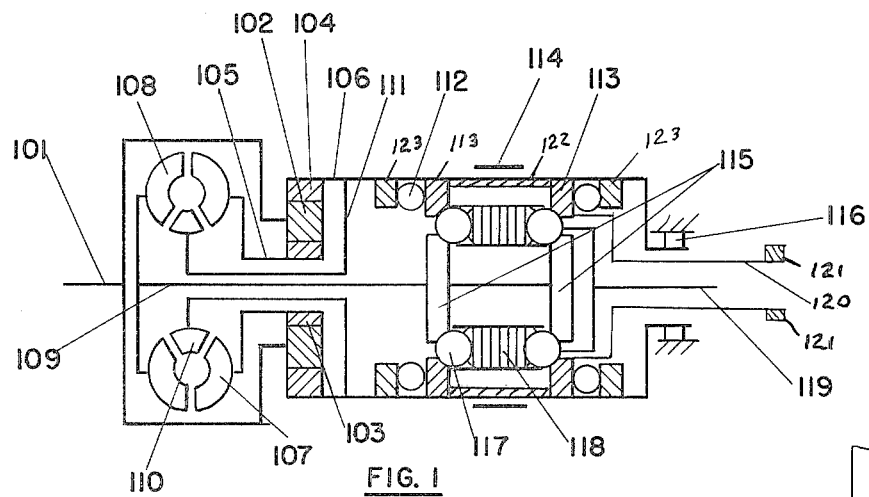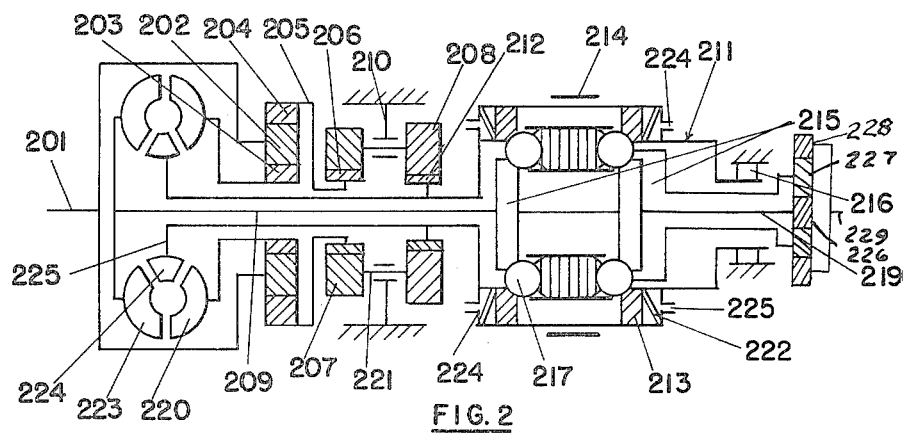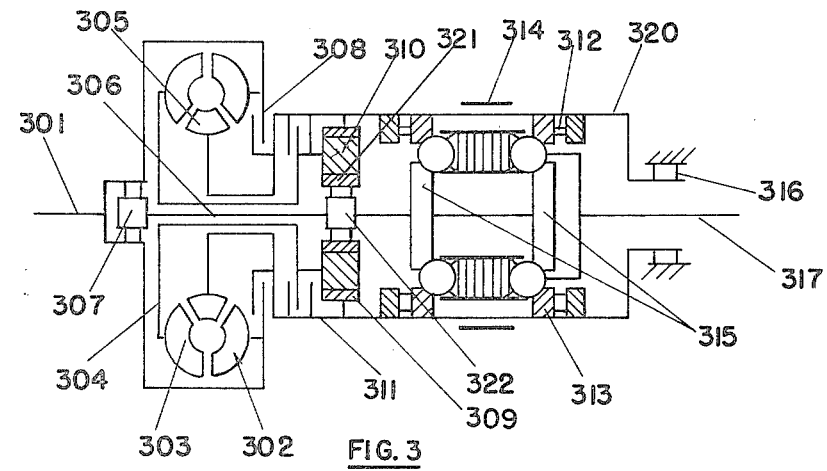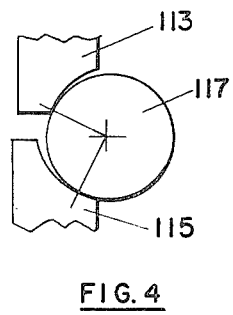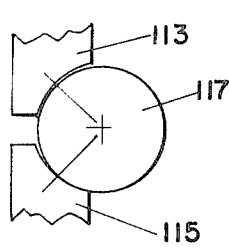

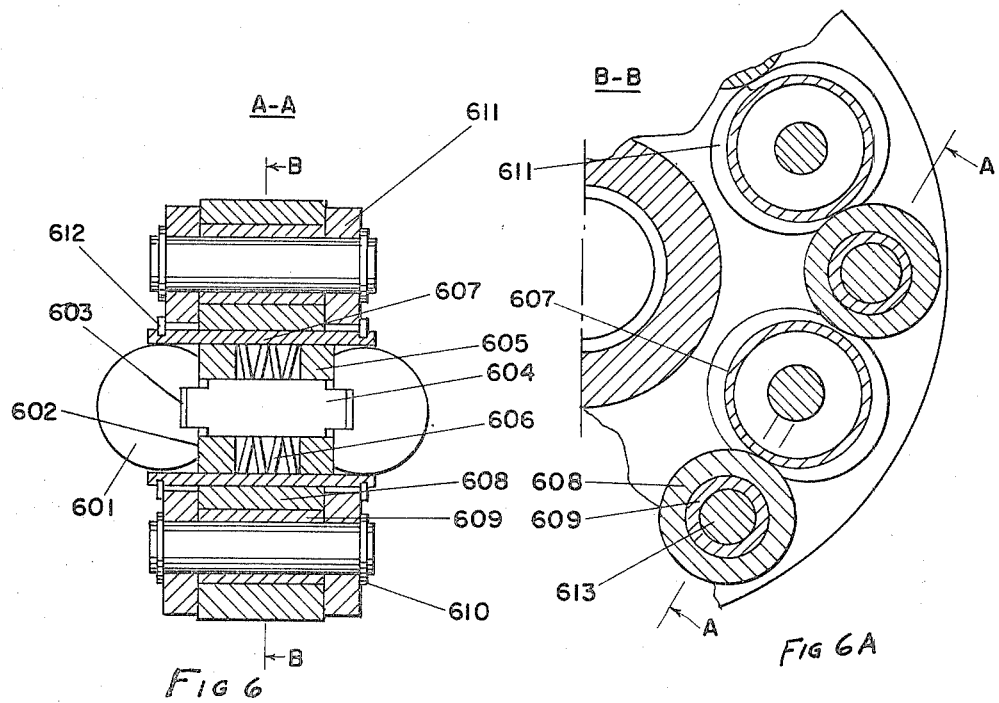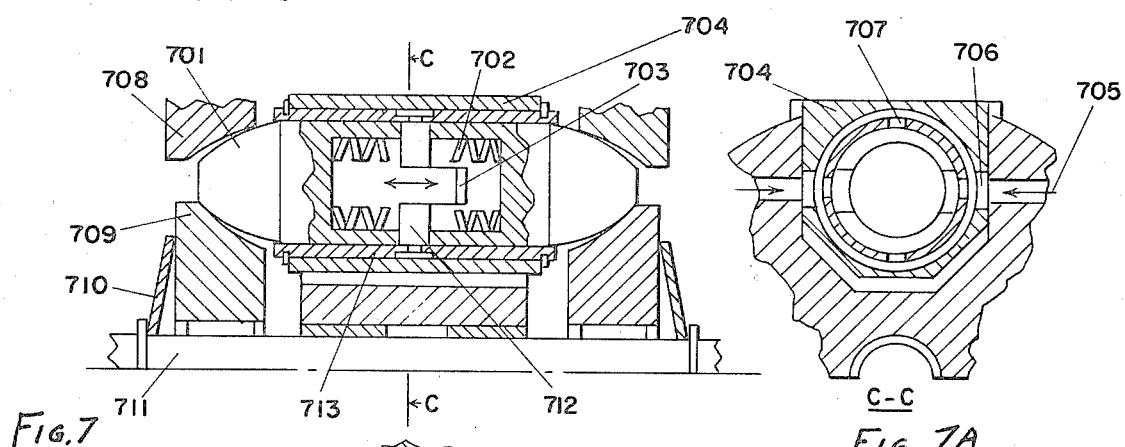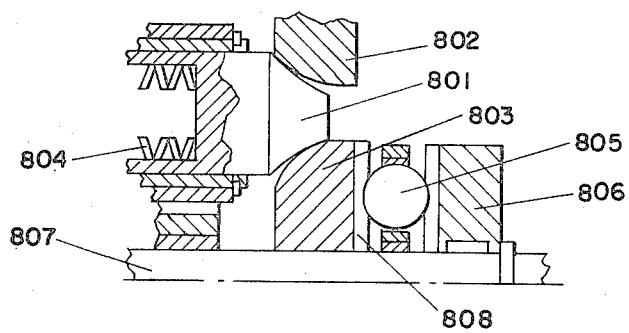

POWER TRANSMISSION

This application constitutes an improvement over previous transmissions in that a longer life, a greater capacity, and a higher efficiency is provided.

The above is accomplished by using a low relative speed between the rolling elements of the friction (traction) drives. In the device disclosed, the sun wheels and the outer rings rotate with a slightly different speed, carry greater load by the rolling elements and result in minimum wear.

It is, accordingly, an object of the invention to provide an improved infinitely variable transmission simple in construction and low in manufacturing cost.

Another object of the invention is to provide an improved combination planetary transmission and torque converter.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a diagrammatic view of one embodiment of the invention;

FIG. 2 is a view similar to FIG. 1 of another embodiment of the invention;

FIG. 3 is a view of yet another embodiment of the invention;

FIGS. 4 and 5 are detailed views of parts of the invention;

FIG. 6 is a cross-sectional view taken on line A—A of FIG. 6A of another embodiment of the invention;

FIG. 6A is a view taken on line B—B of FIG. 6;

FIG. 7 is a partial cross-sectional view of another embodiment of the invention;

FIG. 7A is a view taken on line C—C of FIG. 7;

FIG. 8 is a view similar to FIGS. 6 and 7 of another embodiment of the invention.

Now with more particular reference to FIG. 1, a design is shown which results in low relative speed between friction sun wheels 115 and outer friction rings 113. This is achieved by using a hydraulic coupling or a hydraulic torque converter. Input shaft 101 transmits power from an engine through the planetary cage to the planetary gears 102 where power splits between the sun gear 103 and the ring gear 104. The sun gear 103 is connected to the input 107 of the hydraulic torque converter or hydraulic coupling. The ring gear 104 is connected through the housing 106, preload ball, or roller-type cams 112 to the outer rings 113 of tee friction drive. The stator 110 of the member 111 to the housing 106. When the hydraulic coupling is used, the member 111 is not required. The output 108 of the hydraulic torque converter or hydraulic coupling is connected through the shaft 109 to the sun wheels 115. The sun wheels 115 and outer rings 113 are in rolling contact with the planetary balls 117 which are individually preloaded by Belleville springs 118 or other suitable means. The outer friction rings 113 have a cam portion and are free in the housing 106 and can be urged toward each other by preload cams 112. When the planetary cage indicated as connected to output load 119 is greater than normal, the preload cams 112 will force outer rings 113 forward each other, therefore, the planetary balls 117 will be urged toward each other also. The sun wheels 115 and outer friction rings 113 have a larger radius than balls 117 on their rolling part, and therefore the ratio of the friction drive will be changed depending on the position of the outer rings 113. It should be noted that due to the preload of planet rolling elements by springs 118 only axial sliding of outer rings 113 is required, not as known in other arrangements where sun rings have to slide axially, too.

When the wheels of the vehicle on which the transmission disclosed herein is installed in an attempt to drive the transmission from its output as in coasting, band 114 is applied and holds ring 122 and the housing 106, outer rings or races 113 and cams 123 are stationary. Outer races 113 interconnected by ring 122 and through part 120 are connected to a clutch 121, which could be engaged and disengaged with a control linkage of a suitable design. Now when the cam rings 123 remain stationary, the outer races 113 through a clutch 121 can be slightly turned (moved in relation to cam rings 123) and, therefore, by cam action the outer races 113 will be moved inward toward each other and the friction unit will be placed into low gear with desired degree of reduction of ratio.

FIG. 4 shows ball 117 in a position in low gear, and FIG. 5 shows ball 117 in a position in high gear. The housing 106 is free to rotate in the same direction as the input shaft 101, but is prevented from rotating in an opposite direction by overrunning clutch 116. When the load on the output shaft 119 is greater than normal during acceleration, the power is transmitted from the input shaft 101 through planetary gears 102, sun gears 103, hydraulic torque 107, 108, 110, where it is multiplied. It then flows to sun wheels 115 of the friction drive. The outer friction rings 113 are locked by overrunning clutch 116 through the preload cams 112 and housing 106. The preload cams therefore serve as reactive members. Outer friction rings 113 will be urged toward each other, placing planetary balls 117 in such a position that the torque multiplication in the friction drive will occur. When the forces at the contact points between sun wheels 115 and planetary balls 117 and between outer rings 113 and planetary balls 117 become equal, the outer rings 113 will become driving members instead of reactive. At such time power from the input shaft 101 will split at the planetary gears 102, between sun gear 103 and ring gear 104, between friction wheels 115 and outer friction rings 113.

Due to the slight slippage in the hydraulic torque converter or the hydraulic coupling 107, 108, 110, the speed of the sun wheels 115 will be somewhat less than in the outer friction rings 113. Therefore, the possible brinneling which is known in rolling elements when they are locked, will be eliminated, the life of the rolling elements will be prolonged, and the maximum capacity will be provided. It will be noted that the planetary balls 117 are spherical members which engage contoured surfaces on the friction rings 113 and sun wheels 115 in such a manner that a speed reduction is accomplished between the sun members 115 and the ring members 113 when proportional to the torsional force between the input 101 and the output 119.

When the transmission is operated in driving range, the planetary gears 102, sun gears 103, and ring gear 104 rotate as one unit. The stator 110 of the hydraulic torque converter 107, 108, 110, which is connected to the housing 106, rotates with the same speed as input shaft 101; and, therefore, the slippage in the hydraulic torque converter is very low. The relative speed between friction wheels 115 and outer friction rings 113 is low also, and therefore the unit has a very high efficiency. During coasting, the band of friction brake 114 will be applied, the housing 106 will be locked, and the friction drive will provide the low gear ratio.

The hydraulic torque converter is used when higher torque multiplication is required as in trucks, and the hydraulic coupling is used in lighter applications, such as in passenger vehicles.

FIG. 2 shows the design where with the hydraulic torque converter or the hydraulic coupling to provide the relative speed between the sun wheels and outer ring of friction drive, the set of gears is also used.

The power from input 201 flows to the planetary cage of the planetary gears 202, sun gears 203, and ring gear 204, where it splits between the hydraulic torque converter and the spur gear 206, which through the member 205 is connected to the ring gear 204. The sun gear 206 is engaged with spur gears 207, which are connected to the spur gears 208 by shaft 221. The shaft 221 can rotate and are received by the planetary cage 210, which in turn is locked in the transmission housing and is stationary.

The spur gear 212 is engaged with spur gears 208 and is connected through the housing 211 to the outer rings 213. The pitch diameter of the spur gears 208 is slightly larger than the pitch diameter of the spur gears 207. Therefore, when forces are balanced and planetary gears 202, 203, and 204 rotate as one unit, the outer rings 213 of the friction unit will rotate slightly faster than sun wheels 215. The power from sun gear 203 flows through the hydraulic torque converter made up of elements 220, 223, and 224 to the sun wheels 215.

The friction drive in this design is identical to FIG. 1, with the exception that the outer rings 213 are preloaded by Belleville springs 222 and hydraulic pressure in chamber 224, while rings 213 act as pistons. 225 is oil supply line.

When the output speed of the cage 219 is zero, the centrifugal forces of the planet ball assembly 217 are also zero, and planetary balls 217 are urged inward by Belleville springs 222 and the hydraulic pressure in chamber 224 through outer rings 213 into the position shown in FIG. 4, corresponding to the low gear. The outer rings 213 are keyed in the housing 211, but can slide in it axially, and now are locked by overrunning clutch 216 and serve as a reactive member.

During the acceleration, when the speed of the output planetary cage 219 will gradually increase, the centrifugal forces of the planetary ball assembly 217 will increase also, and therefore the outer rings 213 will be urged outward. While hydraulic pressure in chamber 224 is gradually reduced automatically or manually and could be kept very low or with no pressure at all at the end of acceleration. In this case, preload on the rolling elements will be provided by Belleville springs 218 only. Therefore, the position of the planetary balls 217 shown in FIG. 4 will be infinitely changed into the position shown in FIG. 5. The Belleville spring 222 is a "constant load" spring and is used to reduce the required hydraulic pressure in chamber 224 during the torque multiplication. Otherwise the hydraulic pressure and springs 218 alone will provide a proper function of a unit.

In "driving and coasting range" the function of the unit is similar to the one described in FIG. 1.

The planetary set made up of gears 227, 228 and 229 are used to provide "reverse" and also make it possible to change speed infinitely from "forward" into "reverse," passing through "zero" speed. As is shown, the planetary cage of planet gears 227 is connected to the output 219 (to the planetary cage) of the friction drive unit, sun gear 226 is connected to the sun wheels 215 and ring gear 228 is connected to the output 229. By changing the speed of the output of the friction unit 219 in relation to sun wheels 215, in other words, in relation to sun gears 226; very wide speed range can be obtained at ring gear 228. By regulating an oil pressure in chambers 224 any desired ratio could be obtained.

FIG. 3 shows the design where the hydraulic torque converter or hydraulic coupling is used not only to provide the low relative speed between the sun wheels 315 and the outer rings 313 in the friction drive unit, but also is used as a retarder during the coasting range as in heavy trucks. In this design, the torque converter or hydraulic coupling is placed before and is connected to the planetary cage of the set of ring gears 309, planetary gear 310, and sun gear 321. In gears 309, 310, and 321 the power splits and flows through the sun gear 321, overrunning clutch 322, to the sun wheels 315, and through the ring gear 309, housing 320, rolling cams 312, to the outer rings 313 of the friction drive.

During the acceleration and driving in traffic, the clutch 308 between the input 302 and the housing 320, and the clutch 311 between the output 304 of the hydraulic torque converter and the housing 320, are disengaged and the function of the transmission is similar to the one described in FIG. 1.

When driving on the highway, the clutch 308 is engaged manually or automatically, the housing 320 and the outer rings 313 rotate with the same speed as input 301, while the sun wheels 315, which receive the power through the hydraulic torque converter or hydraulic coupling 303, 302, 305, due to the slippage in it, will rotate slightly slower than outer rings 313.

During the coasting, light hill, the coasting band 314 is applied, clutches 308 and 311 are disengaged, the power from the output cage 317 flows through sun wheels 315, overrunning clutch 307, while the overrunning clutch 322 is disengaged, to the input shaft 301 to the engine.

During coasting down a steep hill, the coasting band 314 is applied, the clutch 308 is disengaged, the retarding clutch 311 is engaged with the housing 320 and the turbine of the hydraulic torque converter or the output of the hydraulic coupling 303 is locked. The power from the output cage 317 flows through the sun wheels 315, overrunning clutch 307, input shaft 301 to the engine and to the impeller 302 of the hydraulic torque converter or hydraulic coupling, which is a retarder in this case.

FIG. 6 shows planet rolling elements when commercial balls are adopted. In this case planet balls 601 have a flat portion which is in contact with bushings 605. Bushing 605 can slide in bushing 607. In grooves 603 balls receive flat portions of pins 604. Belleville springs 606 placed between bushings 605 provide preload on rolling elements. Pins 604 lock balls in between against relative slippage and also serve as assembly pins for Belleville springs 606. The assembly of planet balls is received by bushings 607, which are located in planetary cage 611 by rings 612. Bushings 607 are in rolling contact with reactive rollers 608 of the planetary cage 611. Reactive rollers 608 have a bearing-type bushing 609 and free to rotate on reactive pins 613 which are locked in the planetary cage 611. The centers of reactive rollers 608 are located on axis A—A and axis A—A is at 90° with axis O—O, along which planet assembly bushing 607 can move a distance "a" required for overall infinite speed range. This arrangement provides very low unit pressure at contact between bushing 607 and roller 608, requires a very low force to move planet assembly radially along axis O—O and permits rotation of the unit in either direction.

When Belleville springs are used to preload the sun wheels or inner races, as shown on FIG. 7, then the active preload by Belleville springs 606, FIG. 6 can be used only during the normal operational speed driving range. In this case, Belleville springs 606 carry constant preload and planet rolling elements are solidly compressed against pins 604, FIG. 6, or against each other (703, FIG. 7). During the torque multiplication or acceleration period, the preload is controlled and the ratio is changed, as shown in FIG. 1, by cams 112. This method provides simple rate of springs and uniform preload by these springs during the normal operational speed.

FIG. 7 shows planet rollers when the radius of roller 701 is not located on axis O—O and planet rollers are preloaded not only by Belleville springs 702 but hydraulically also. In this case, planet assembly is received in radially slidable bushing 704 and oil is delivered through openings 705 of planetary cage, 706 of bushing 704 and 707 of bushing 713. The outer rings 708 are reactive members and locked but sun rings 709 are splined to the shaft 711 and can slide axially. When oil pressure in chamber 712 (between planet rollers) is reduced to normal planet rollers 701 and sun rings 709 will return inward by Belleville springs 710 to the normal position (driving range).

FIG. 8 shows planet rollers when concave surface of roller 801 is opposite than shown on FIG. 7. Planet rollers are preloaded by Belleville springs 804, sun rings 803 are free on shaft 807 but through the cam portion 808 and ball or roller cam 805, 806 can receive power from the shaft 807 to which cam 806 is splined. Outer rings 802 are reactive members and locked. Whenever torque is increased can 805, 806 will move sun rings 803 inward and, therefore, change the speed ratio of the unit.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a torque converter, a first planetary transmission, and a second planetary transmission, said first planetary transmission, and second planetary transmission and said torque converter each having a first member, a second member, and a third member, an input member connected to said second member of said first planetary transmission, said third member of said torque converter being connected to said third member of said first planetary transmission, said first member of said torque converter being connected to said third member of said second planetary transmission, said second member of said torque converter being connected to said first member of said first planetary transmission and to said first member of said second planetary transmission, output means connected to said second member of said second planetary transmission, restraining means connected to said first member of said first planetary transmission and to said first member of said second planetary transmission, said first member of said second planetary transmission comprising two spaced ring member, said third member of said second planetary transmission comprising two spaced sun wheel members, generally spherical members disposed between said ring members and said sun members engaging said ring members and said sun members, and means urging said spherical members into engagement with said ring members and said sun wheel members, and cam members urging said ring members toward each other and toward the generally spherical members in proportion to the torsional force between said ring members and said sun members, said ring members and said sun members having surfaces engaged by said spherical members contoured in such a manner that a speed reduction is accomplished between said sun wheels and said ring members.

2. The combination recited in claim 1 wherein resilient means is provided on said second transmission urging said sun members toward each other and urging said ring members toward each other and into frictional engagement with said spherical members.

3. The combination recited in claim 1 wherein said first element, said second element, and said third element of said first planetary transmission comprises a ring element, a planetary member, and a sun element respectively.

4. The combination recited in claim 1 wherein said spherical planetary members engage a curved surface on said ring members and curved surface on said sun members, both having a radius of curvature greater than the radius of said spherical members.

5. The combination recited in claim 1 wherein said ring elements of said transmission are connected together to rotate together.

6. The combination recited in claim 2 wherein said resilient means comprises Belleville springs.

* * * * *